United States Patent
Kubo

(10) Patent No.: US 12,304,250 B2
(45) Date of Patent: May 20, 2025

(54) PNEUMATIC TIRE

(71) Applicant: Toyo Tire Corporation, Itami (JP)

(72) Inventor: Naoya Kubo, Hyogo (JP)

(73) Assignee: Toyo Tire Corporation, Itami (JP)

( * ) Notice: Subject to any disclaimer, the term of this patent is extended or adjusted under 35 U.S.C. 154(b) by 30 days.

(21) Appl. No.: 18/338,396

(22) Filed: Jun. 21, 2023

(65) Prior Publication Data
US 2024/0017572 A1 Jan. 18, 2024

(30) Foreign Application Priority Data
Jul. 5, 2022 (JP) ................................. 2022-108495

(51) Int. Cl.
*B60C 11/04* (2006.01)
*B60C 11/12* (2006.01)

(52) U.S. Cl.
CPC .......... *B60C 11/1236* (2013.01); *B60C 11/04* (2013.01); *B60C 11/1204* (2013.01); *B60C 11/1263* (2013.01); *B60C 2011/129* (2013.01)

(58) Field of Classification Search
CPC . B60C 11/0306; B60C 11/04; B60C 11/1236; B60C 11/1263; B60C 2011/0381; B60C 2011/039; B60C 2011/0395
See application file for complete search history.

(56) References Cited

U.S. PATENT DOCUMENTS

| | | | |
|---|---|---|---|
| 3,749,145 A * | 7/1973 | Hart | B60C 11/0306 |
| | | | 152/DIG. 3 |
| 2011/0220259 A1* | 9/2011 | Suzuki | B60C 11/0083 |
| | | | 152/209.18 |
| 2017/0096034 A1 | 4/2017 | Taniguchi | |
| 2017/0100965 A1* | 4/2017 | Kikuchi | B60C 11/1263 |
| 2019/0344622 A1* | 11/2019 | Shimizu | B60C 11/04 |
| 2020/0031171 A1 | 1/2020 | Fujioka | |
| 2020/0047559 A1* | 2/2020 | Nakatani | B60C 11/0008 |

(Continued)

FOREIGN PATENT DOCUMENTS

DE 102016117816 A1 4/2017
DE 112019003924 T5 5/2021
(Continued)

OTHER PUBLICATIONS

Office Action issued on Dec. 18, 2024, in corresponding German Application No. 10 2023 116 016.8, 12 pages.

*Primary Examiner* — Robert C Dye
(74) *Attorney, Agent, or Firm* — Maier & Maier, PLLC

(57) ABSTRACT

An intermediate rib has a plurality of intermediate sipes arranged at a predetermined pitch in a tire-circumferential direction and extending in a direction intersecting the tire-circumferential direction, the intermediate sipes include a plurality of first intermediate sipes on one side in a tire-width direction and a plurality of second intermediate sipes on another side in the tire-width direction, the first intermediate sipes and second intermediate sipes are alternately arranged in the tire-circumferential direction, a width of the center rib has a size which is at least 104% of the width of the intermediate rib, a pair of the intermediate sipes adjacent in the tire-circumferential direction have overlap parts which overlap each other when viewed in the tire-circumferential direction, and a tire-width direction length of this overlap part is at least 30% of the width of the intermediate rib.

7 Claims, 6 Drawing Sheets

(56) References Cited

U.S. PATENT DOCUMENTS

2022/0105756 A1      4/2022  Nagahashi
2022/0332148 A1 *   10/2022  Takahashi ........... B60C 11/1259

FOREIGN PATENT DOCUMENTS

| DE | 102023105655 A1 | 10/2023 |
| EP | 2759417 A1 | 7/2014 |
| JP | 5438609 B2 | 3/2014 |

* cited by examiner

PNEUMATIC TIRE

This application is based on and claims the benefit of priority from Japanese Patent Application No. 2022-108495, filed on 5 Jul. 2022, the content of which is incorporated herein by reference.

FIELD

The present invention relates to a pneumatic tire.

BACKGROUND

Conventionally, a pneumatic tire has been known in which the tread pattern is formed by a plurality of grooves in the tread surface, which is the contact surface with the road surface. As the plurality of grooves, for example, main grooves along the tire circumferential direction, fine grooves extending in a direction intersecting the tire-circumferential direction called sipes formed in the surface of ribs between a plurality of the main grooves, etc. can be exemplified. Japanese Patent No. 5438609 discloses a tire in which four main grooves are formed, and including three ribs extending in the tire-circumferential direction between main grooves on both sides in the tire-width direction. The three ribs disclosed in Japanese Patent No. 5438609 includes one center rib arranged at the center in the tire-width direction, and two intermediate ribs arranged on both sides of this center rib, and shows the point that the width of the center rib is smaller than the intermediate ribs.

SUMMARY

Most vehicles such as SUV (Sport Utility Vehicle) and EV (Electric Vehicle) which have been becoming popular in recent years have relatively greater weight, and thus the load on the tires is also great. In the case of mounting a tire such as that disclosed in the above Japanese Patent No. 5438609 to such high-load type vehicles, the load on the center rib having a narrower width than the intermediate ribs on both sides, and there is concern over uneven war in which the wear at the intermediate rib being greater tending to occur. It should be noted that, in a pneumatic tire, sufficient CFmax (maximum corning force) is demanded; however, Japanese Patent No. 5438609 does not describe the relationship between CFmax and tread pattern.

Therefore, the present invention has an object of providing a pneumatic tire which can suppress uneven wear of a center rib even in the case of a high-load type vehicle, and is capable of securing the required CFmax.

A pneumatic tire according to the present invention is equipped with a tread having a tread pattern, in which the tread includes: a plurality of ribs extending in a tire-circumferential direction constituting the tread pattern, and a plurality of main grooves disposed between the plurality of ribs, and extending in the tire-circumferential direction constituting the tread pattern; in which the main groove includes: a pair of center main grooves disposed at a center in a tire-width direction, and intermediate main grooves respectively disposed at an outer side in the tire-width direction of the pair of center main grooves; in which the ribs include: one center rib disposed between the pair of center main grooves, and an intermediate rib disposed between the center main groove and the intermediate main groove; in which the intermediate rib has intermediate sipes disposed at a predetermined pitch in the tire-circumferential direction, and extending in a direction which intersects the tire-circumferential direction; in which the intermediate sipes include a plurality of first intermediate sipes on one side in the tire-width direction and a plurality of second intermediate sipes on another side in the tire-width direction, and the plurality of first intermediate sipes and the plurality of second intermediate sipes are alternately disposed in the tire-circumferential direction; in which a width of the center rib has a size which is at least 104% of a width of the intermediate rib; and in which a pair of the intermediate sipes adjacent in the tire-circumferential direction have overlap parts which overlap each other when viewing in the tire-circumferential direction, and a tire-width direction length of the overlap part is at least 30% of the width of the intermediate rib.

According to the present invention, it is possible to provide a pneumatic tire which can suppress uneven wear of a center rib even in the case of a high-load type vehicle, and is capable of securing the required CFmax.

DETAILED DESCRIPTION OF THE EMBODIMENTS

Figure 1:
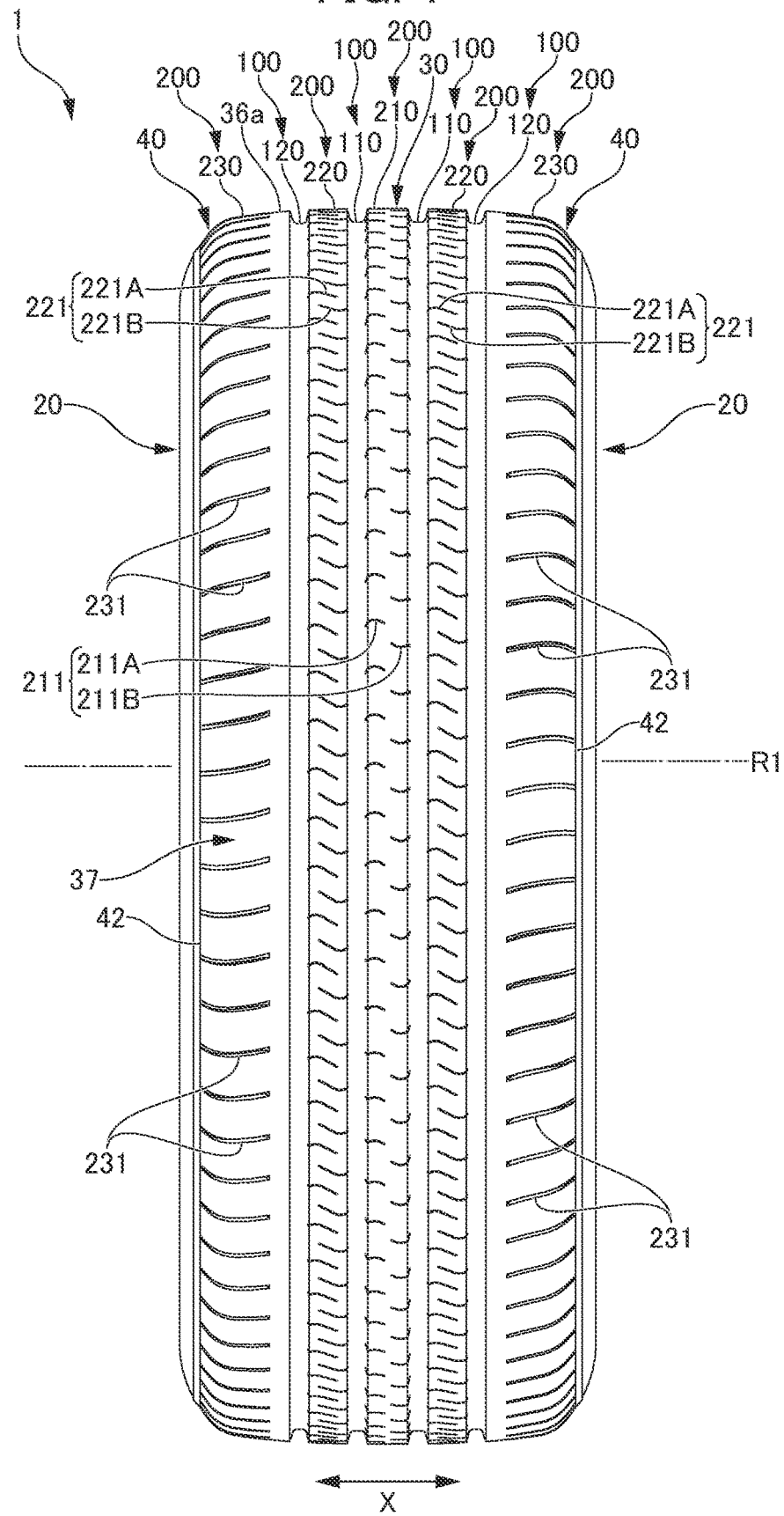
FIG. 1 is a front view of a pneumatic tire according to an embodiment.
Figure 2:
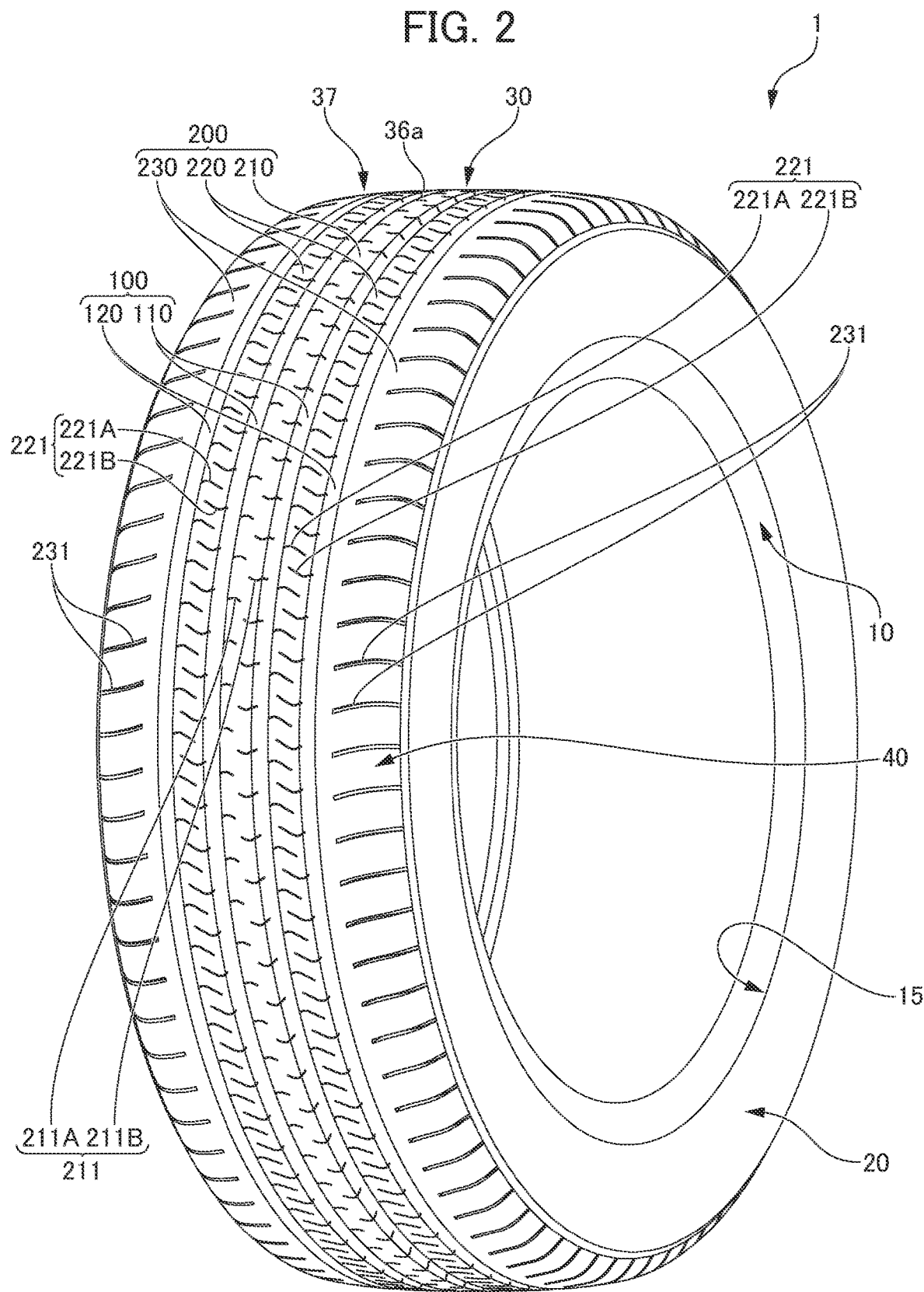
FIG. 2 is a perspective view of the pneumatic tire according to the embodiment.
Figure 3:
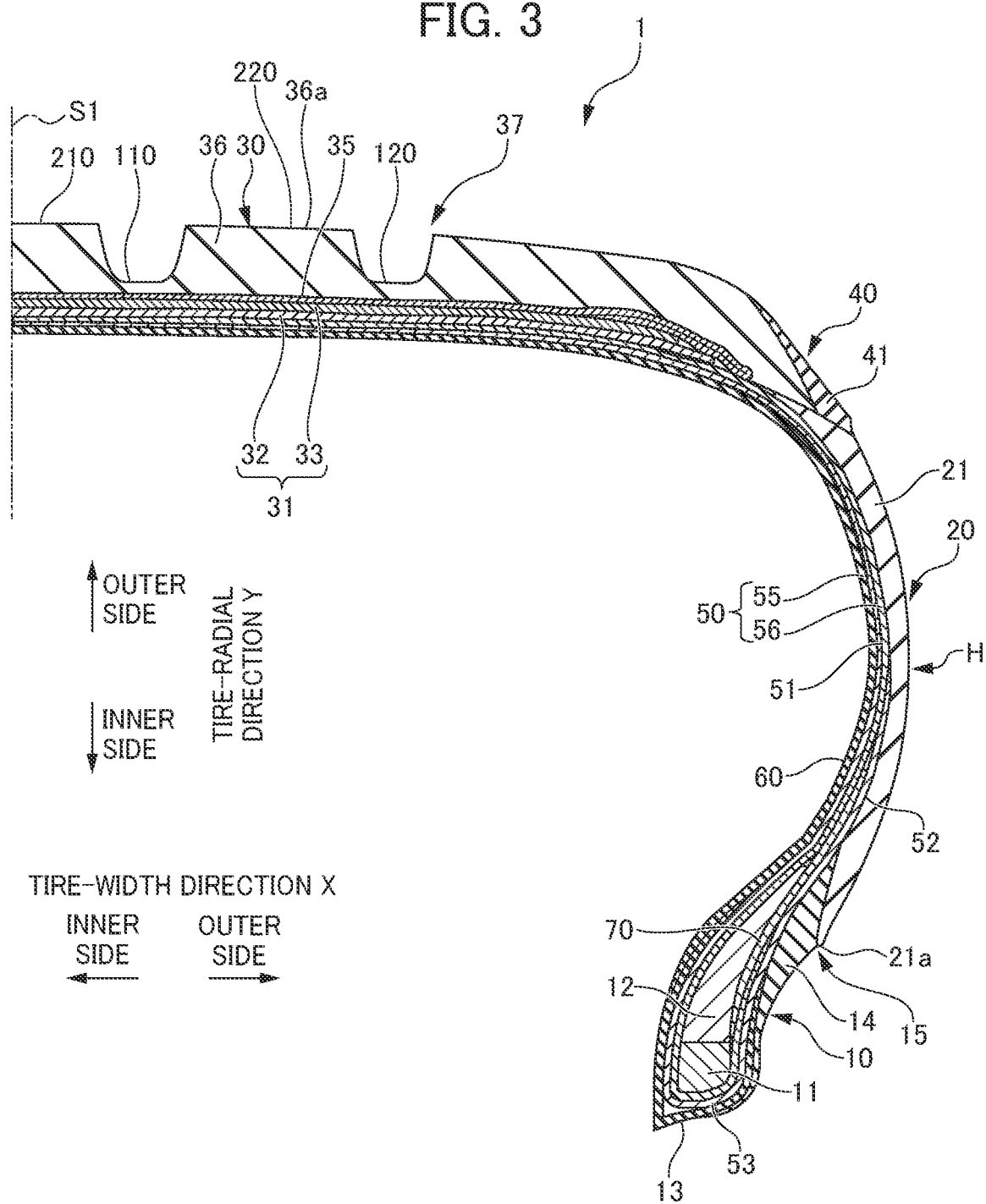
FIG. 3 is a view showing a half section in a tire-width direction of the pneumatic tire according to the embodiment.

FIG. 1 is a front view of a tire 1, which is a pneumatic tire according to an embodiment. FIG. 2 is a perspective view seeing the tire 1 from an oblique elevation. FIG. 3 shows a half section in a tire-width direction of the tire 1, with S1 being a tire equatorial plane. The tire equatorial plane S1 is a plane orthogonally intersecting a tire rotational axis (tire meridian) R1 shown in FIG. 1, and is positioned at the center in the tire-width direction shown by the arrow X.

As shown in FIGS. 2 and 3, the tire 1 of the embodiment includes: a pair of left/right beads 10; a pair of left/right sidewalls 20 extending to the outer side in a tire-radial direction from each of the pair of beads 10; tread 30 arranged between the pair of sidewalls 20; and a pair of left/right shoulders 40 arranged between the tread 30 and each of the pair of sidewalls 20.

Herein, the internal structure of the tire 1 of the embodiment will be explained by referencing FIG. 3. The basic internal structure of the tire 1 is left/right symmetrical in a cross section in the tire-width direction. FIG. 3 is a view showing a half section of the right half of the tire 1, and the left half (not illustrated) is the same structure. The cross-sectional view of FIG. 3 is a cross-sectional view in the tire-width direction (tire meridian line cross-sectional view) in an unloaded state mounting the tire 1 to a standard rim (not shown), and filling with standard internal pressure. It should be noted that standard rim indicates a rim serving as a standard decided by JATMA corresponding to the tire size. In addition, standard internal pressure is 180 kPa in the case of the tire being for a passenger vehicle, for example.

It should be noted that the tire 1 according to the embodiment, for example, is a pneumatic tire for passenger vehicles including SUV and EV. It should be noted that the tire 1 according to the embodiment can be adopted for various vehicles such as light trucks, trucks and buses, in addition to passenger vehicles.

FIG. 3 shows the tire-width direction by the arrow X, and the tire-radial direction by the arrow Y. Tire-width direction is a direction parallel to the tire rotation axis R1 shown in FIG. 1, and is the paper plane left/right direction in FIG. 3. A tire-width direction inner side is a direction approaching the tire equatorial plane S1 in the tire-width direction, and is the left side of the paper plane in FIG. 3. Tire-width direction outer side is a direction distancing from the tire equatorial plane S1 in the tire-width direction, and is the right side of the paper plane in FIG. 3.

In addition, tire-radial direction is a direction perpendicular to the tire rotation axis R1 shown in FIG. 1, and is the up/down direction in the paper plane of FIG. 3. Tire-radial direction outer side is a direction distancing from the tire rotation axis R1, and is the upper side in the paper plane of FIG. 3. Tire-radial direction inner side is a direction approaching the tire rotation axis R1, and is the lower side in the paper plane of FIG. 3.

FIG. 3 shows the bead 10, sidewall 20, tread 30 and shoulder 40. The tire 1 has a carcass ply 50 inside thereof. The surface on an inner cavity side of the tire 1 is configured by an inner liner 60.

A left and right pair of beads 10 are arranged on both sides in the tire-width direction and at ends on the tire-radial direction inner side. The bead 10 has a bead core 11, a bead filler 12 extending from the bead core 11 to the tire-radial direction outer side, a chafer 13 and rim strip rubber 14.

The bead core 11 is an annular member made by bead wires made of rubber-coated metal being wrapped around in the tire-circumferential direction several times. The bead core 11 is a member playing the role of fixing the tire 1 filled with air to the rim. The bead filler 12 takes on a tapered shape having a thickness which decreases as extending from the tire-radial direction inner side to the tire-radial direction outer side. The bead filler 12 is provided in order to raise the rigidity of a peripheral portion of the bead 10, and ensure high maneuverability and stability. The bead filler 12, for example, is configured from rubber having higher hardness than the surrounding rubber members.

The chafer 13 further surrounds the outer side of the carcass ply 50 provided to surround the bead core 11 and bead filler 12. The rim strip rubber 14 is arranged at the outer side in the tire-width direction of the chafer 13 and carcass ply 50. The chafer 13 and rim strip rubber 14 contact the inner surface of the rim to which the tire 1 is mounted.

The sidewall 20 includes sidewall rubber 21 arranged at the tire-width direction outer side of the carcass ply 50. The sidewall rubber 21 configures the side face on the tire-circumferential direction outer side of the tire 1. The sidewall rubber 21 is a portion which is the most flexible when the tire 1 makes a cushion action, and normally a flexible rubber having fatigue resistance is adopted.

A tire-radial direction inside end of the sidewall rubber 21 includes an apex part 21a along the tire-circumferential direction. A rim protector 15 protecting the rim from external injury is configured from this apex part 21a and the outer surface of the aforementioned rim strip rubber 14. This rim protector 15 is continuous in a ring shape in the tire-circumferential direction.

The tread 30 includes an endless belt 31 and cap ply 35, and tread rubber 36. The belt 31 is arranged at the outer side in the tire-radial direction of the inner liner 60. The cap ply 35 is arranged at the outer side in the tire-radial direction of the belt 31. The tread rubber 36 is arranged at the outer side in the tire-radial direction of the cap ply 35.

The belt 31 is a member reinforcing the tread 30. The belt 31 in the embodiment is a two-layer structure including an inner side belt 32 arranged at the tire-radial direction outer side of the inner liner 60, and an outer side belt 33 arranged at the tire-radial direction outer side of the inner side belt 32. The inner side belt 32 and outer side belt 33 both have a structure in which a plurality of cords such as steel cords are covered by rubber. It should be noted that the belt 31 is not limited to a two-layer structure, and may have a structure of one layer, or three or more layers.

The cap ply 35 is a member reinforcing the tread 30 along with the belt 31. The cap ply 35, for example, has a structure in which a plurality of organic fiber cords having an insulation property such as polyimide fibers is covered with rubber. The cap ply 35 of the embodiment is one layer; however, it may be a structure of two or more layers. By providing the cap ply 35, it is possible to achieve an improvement in durability and reduction in road noise during travel.

The tread rubber 36 is arranged to the outer side in the tire-radial direction of the cap ply 35. The outer surface of the tread rubber 36 configures the tread surface 36a which contacts the road surface. The tread pattern 37 is provided to the tread surface 36a. The tread pattern 37 will be described in detail later.

The shoulder 40 is arranged in a region transitioning from the sidewall 20 to the tread 30. The shoulder 40 includes shoulder rubber 41.

The carcass ply 50 is bridged between the pair of beads 10. The carcass ply 50 configures a ply serving as the backbone of the tire 1. The carcass ply 50 is embedded within the tire 1, in a form passing through the pair of sidewalls 20 and the tire inner cavity side of the tread 30 between the pair of beads 10. In the tread 30, the belt 31 is arranged at the outer side in the tire-radial direction of the carcass ply 50.

The carcass ply 50 includes a plurality of ply cords (not shown) serving as the backbone of the tire 1. The plurality of ply cords extends in plane along the tire-width direction, for example, and are arranged side by side in the tire-circumferential direction. This ply cord is configured from an insulative organic fiber cord such as polyester or polyamide, or the like. The plurality of ply cords is coated by rubber, whereby the carcass ply 50 is configured.

The carcass ply 50 has a ply main body part 51, ply folding part 52, and an elbow-shaped bend 53. The ply main body part 51 is a portion extending from the inner side in the tire-width direction of one bead core 11, through one sidewall 20, the tread 30 and the other sidewall 20 until the inner side in the tire-width direction of the other bead core 11. The ply folding part 52 is a portion which extends to the outer side in the tire-radial direction on the outer side in the tire-width direction of the bead filler 12, by being folded back around the bead core 11 from the tire-radial direction inner end of the ply main body part 51. The elbow-shaped bend 53 is a portion which extends from the ply main body part 51 and bends in a U-shape around the bead core 11, and then extends continuously with the ply folding part 52. The ply main body part 51 and ply folding part 52 are continuous via the elbow-shaped bend 53.

The carcass ply 50 of the embodiment has a two-layer structure in which a first carcass ply 55 and second carcass ply 56 are overlapped. In the ply main body part 51, the first carcass ply 55 is arranged on the tire inner cavity side of the second carcass ply 56. In the ply folding part 52, the first carcass ply 55 is arranged on the tire-width direction outer side of the second carcass ply 56. The first carcass ply 55 of the ply folding part 52 extends from the elbow-shaped bend 53 until near the tire maximum-width position H in the outer surface of the sidewall 20. The second carcass ply 56 of the ply folding part 52 extends from the elbow-shaped bend 53 until the middle of the bead filler 12. The tire-radial direction outside end of the first carcass ply 55 of the ply folding part 52 is superimposed on the second carcass ply 56 of the ply main body part 51.

At the tire-width direction outer side of the bead filler 12, the side reinforcement layer 70 which is a reinforcement layer is arranged by a steel member. This side reinforcement layer 70 is sandwiched between the bead filler 12 and the ply folding part 52 of the carcass ply 50, and further extends from the bead filler 12 to the tire-radial direction outer side.

The carcass ply 50 of the embodiment is a two-layer structure; however, the carcass ply 50 may be one layer, or may be three or more layers. When the carcass ply 50 is configured by a ply of two layers or a structure of more layers than this, it is preferable for the tire 1 to be sufficiently suppressed from locally deforming in the vicinity of the mounting part of the rim.

The inner liner 60 covers the tire inner surface between the pair of beads 10. The inner liner 60 covers the inner surface of the tread 30 and the ply main body part 51, in a region spanning from the tread 30 to the sidewall 20. In addition, the inner liner 60 covers the inner surface of the ply main body part 51 and chafer 13, in a region spanning from the sidewall 20 to the bead 10. Therefore, the inner liner 60 configures the inner wall surface of the tire 1. The inner liner 60 is configured by air permeation resistant rubber, whereby the air inside the tire inner cavity is prevented from leaking to outside.

Herein, as the rubber adopted in the bead filler 12, rubber having higher hardness than at least the sidewall rubber 21 and inner liner 60 is used. The hardness of the rubber is a value (durometer hardness) measured by a type-A durometer based on JIS K6253 in a 23° C. atmosphere.

For example, when setting the hardness of the sidewall rubber 21 as a reference, the hardness of the bead filler 12 is preferably on the order of at least 1.2 to no more than 2.3 times the hardness of the sidewall rubber 21. The hardness of the rim strip rubber 14 is more preferably on the order of at least 1 to no more than 1.6 times the hardness of the sidewall rubber 21. By establishing such hardness, it is possible to keep the balance in flexibility as a tire and rigidity in the vicinity of the beads 10.

The above is the internal structure of the tire 1 according to the embodiment. Next, the tread pattern 37 of the tread 30 according to the embodiment will be described in detail.

Figure 4:
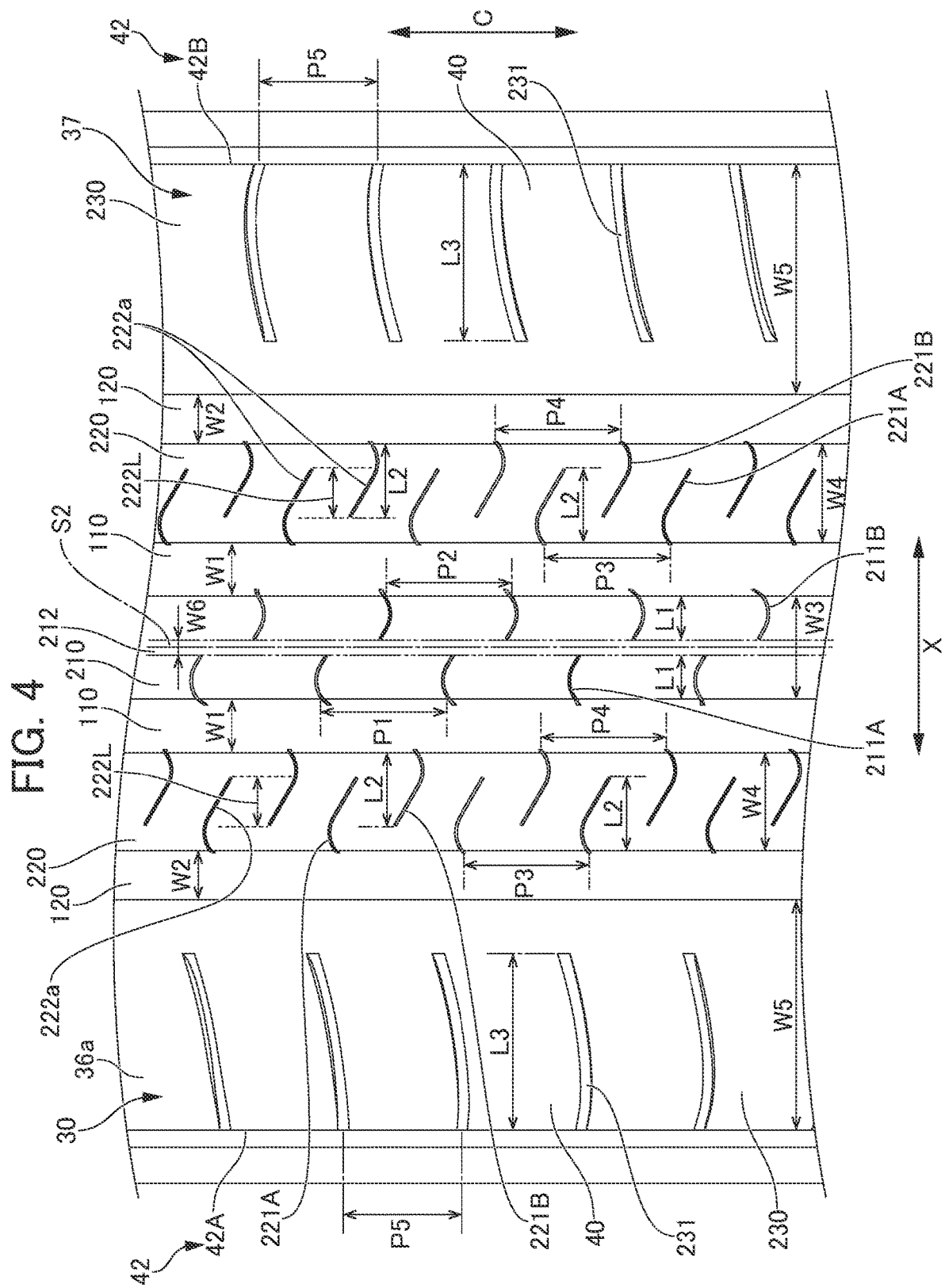
FIG. 4 is a partial enlarged front view showing a tread surface of the tire according to the embodiment.
Figure 5:
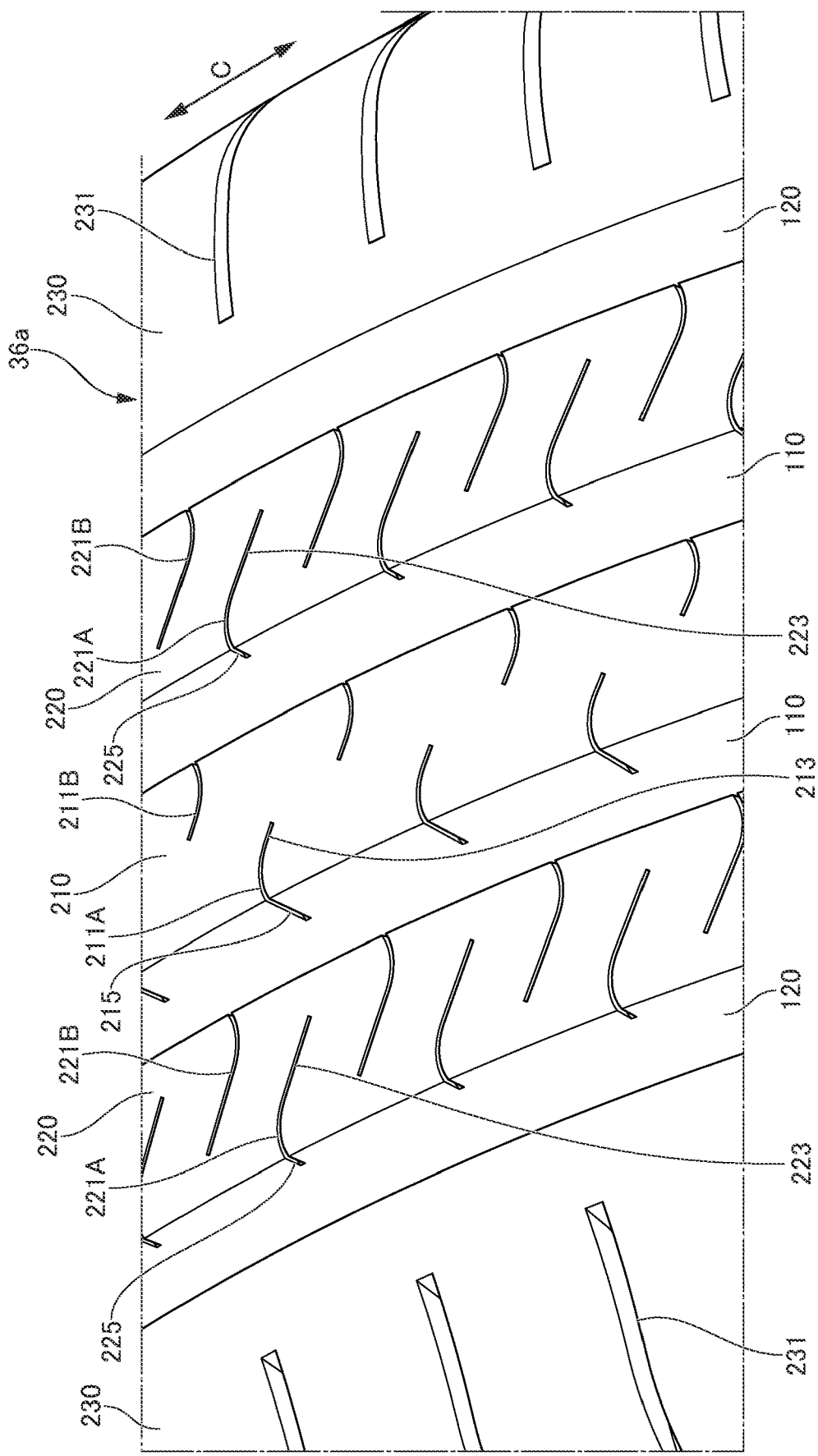
FIG. 5 is a partial enlarged perspective view showing a tread surface of the tire according to the embodiment.

FIG. 4 is a partial enlarged view of a front view of the tire 1 shown in FIG. 1, and shows a tread surface 36a of the tread 30 having the tread pattern 37. FIG. 5 shows a part of the tread surface 36a in the case of viewing the tread surface 36a from an oblique direction. The arrow C in FIGS. 4 and 5 is the tire-circumferential direction. In addition, FIG. 4 shows a tire-width direction X. As shown in FIG. 4, the shoulders 40 on both sides in the tire-width direction have a ring-shaped shoulder edge 42 along the tire-circumferential direction at the tire-width direction outer end. Hereinafter, the shoulder edge 42 on one side in the tire-width direction (left side in FIG. 4) may be referred to as a first shoulder edge 42A, and the shoulder edge 42 on the other side in the tire-width direction (right side in FIG. 4) may be referred to as a second shoulder edge 42B.

As shown in FIGS. 1 and 4, the tread 30 of the embodiment includes a plurality of main grooves 100 and a plurality of ribs 200 constituting the tread pattern 37. The plurality of main grooves 100 and plurality of ribs 200 all extend in the tire-circumferential direction. The plurality of main grooves 100 are arranged between the plurality of ribs 200. The tread pattern 37 of the embodiment is a so-called symmetric pattern, and is a non-directional pattern in which the rotational direction of the tire 1 is not specified.

The tread pattern 37 of the embodiment has four main grooves 100. The four main grooves 100 include a pair of center main grooves 110 arranged at the center in the tire-width direction, and a pair of intermediate main grooves 120 respectively arranged at the outer side in the tire-width direction of the pair of center main grooves 110.

As shown in FIG. 4, in the main grooves 100, the two center main grooves 110 have the same width W1, and the two intermediate main grooves 120 have the same width W2. The width W1 of the center main groove 110 and the width W2 of the intermediate main groove 120 may be the same or may be different. For example, the width W1 of the center main groove 110 may be larger than the width W2 of the intermediate main groove 120, and conversely, the width W2 of the intermediate main groove 120 may be larger than the width W1 of the center main groove 110. The width W1 of the center main groove 110 and the width W2 of the intermediate main groove 120, for example, are at least 10 mm and no more than 15 mm; however, they are not limited thereto.

The tread pattern 37 of the embodiment has three ribs 200. The three ribs 200 includes one center rib 210 arranged between a pair of the center main grooves 110, a pair of intermediate ribs 220 arranged between the center main groove 110 and intermediate main groove 120, and a pair of shoulder ribs 230 arranged at the outer side in the tire-width direction of the intermediate main groove 120.

In the ribs 200, a width W3 of the center rib 210 is larger than a width W4 of an intermediate rib 220. In the embodiment, the width W3 of the center rib 210 preferably has a size of at least 104% of the width W4 of the intermediate rib 220. In addition, as the upper limit for the ratio thereof, for example, 120% is preferable. More specifically, satisfying this condition, each of the width W3 of the center rib 210 and the width W4 of the intermediate rib 220 are set to at least 22 mm and no more than 26 mm, for example.

The center rib 210 has a plurality of center sipes 211 opening to tread surface 36a, i.e. the outer surface of the center rib 210. The center sipe 211 is a fine groove having a shape extending in a direction intersecting the tire-circumferential direction. The groove width of the center sipe 211 is no more than 1 mm.

The plurality of center sipes 211 include a plurality of first center sipes 211A and a plurality of second center sipes 211B. The first center sipe 211A is arranged at the first shoulder edge 42A side of the center rib 210 (left side in FIG. 4). The second center sipe 211B is arranged at the second shoulder edge 42B side of the center rib 210 (right side in FIG. 4). The plurality of first center sipes 211A and plurality of second center sipes 211B are alternately arranged in the tire-circumferential direction. The plurality of first center sipes 211A are arranged at a predetermined pitch in the tire-circumferential direction. Similar to this, the plurality of second center sipes 211B is also arranged at a predetermined pitch in the tire-circumferential direction.

The first center sipe 211A and second center sipe 211B are the same shape, and the pair of first center sipe 211A and second center sipe 211B adjacent in the tire-circumferential direction are arranged so as to be point symmetrical.

The first center sipe 211A opens to the main groove 100 on the left side of the center rib 210 (center main groove 110 on the left side in FIG. 4) in FIG. 4, extends shortly from this opening end to the right side while sloping upwards at the upper side, which is one side in the tire-circumferential direction, and then shortly extends to the right side while bending to the lower side, which is the opposite side in the tire-circumferential direction, and sloping to end without reaching the center in the width direction of the center rib 210. The first center sipe 211A has a substantially circular arc shape.

The second center sipe 211B opens to the main groove 100 on the right side of the center rib 210 in FIG. 4 (center main groove 110 on the right side in FIG. 4), extends shortly from this opening end to the left side while sloping to the lower side, which is the other side in the tire-circumferential direction, and then shortly extends to the left side while bending to slope to the upper side, which is the opposite side in the tire-circumferential direction, and ends without reaching the center in the width direction of the center rib 210. The second center sipe 211B has a substantially circular arc shape.

The length L1 in the tire-width direction of the first center sipe 211A and second center sipe 211B of the outer surface of the center rib 210 (tread surface 36a) is on the order of 10 mm, more specifically, is set to 10.15 mm, for example. The tire-circumferential direction pitch P1 of the plurality of first center sipes 211A and the tire-circumferential direction pitch P2 of the plurality of second center sipes 211B in the outer surface of the center rib 210 (tread surface 36a) are the same, and preferably at least 20 mm and no more than 40 mm. These pitches P1, P2 may be equal pitch; however, five different pitches: 23.3 mm, 26.2 mm, 29.5 mm, 33.0 mm, 37.1 mm, for example, may be arranged by configuring so as to randomly arrange in the tire-circumferential direction.

The first center sipe 211A and second center sipe 211B both do not reach the center in the width direction of the center rib 210. In the pair of first center sipe 211A and second center sipe 211B adjacent in the tire-circumferential direction thereby will not overlap each other when viewing in the tire circumferential direction. Therefore, a flat region 212 without sipes is continuous in the tire-circumferential direction on the tire equator S2 of the outer surface of the center rib 210. A width W6 of this flat region 212 is preferably at least 5% and no more than 20%, for example, relative to the width of the center rib 210.

Figure 6:
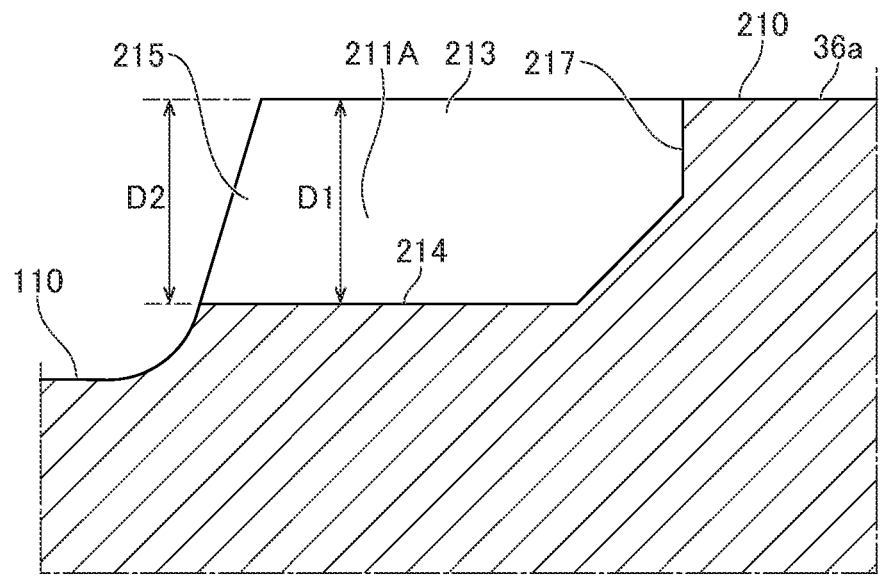
FIG. 6 is a cross-sectional view showing a groove shape of the center sipe (first center sipe) according to the embodiment.

FIG. 6 is a cross-sectional view showing the groove shape of the first center sipe 211A, and is a cross-sectional view shown by a cut section along a plane through the groove width center of the first center sipe 211A. As shown in FIG. 6, the first center sipe 211A has an opening 213 to the outer surface of the center rib 210 (tread surface 36a), a bottom part 214 within the center rib 210, a side opening (corresponding to the aforementioned opening end) 215 which opens to the main groove 100 (center main groove 110 on the left side), and a terminus edge 217 which forms a terminus in the width direction within the first center sipe 211A. The bottom part 214 configures a deepest part of the first center sipe 211A. The side opening 215 is continuous with the opening 213, and the depth D2 thereof is approximately the same as the depth D1 of the bottom part 214. FIG. 5 shows a mode in which the side opening 215 opens to the center main groove 110 on the left side. The terminus edge 217 stands up obliquely from the bottom part 214, and then reaches the opening 213 straight along the tire-radial direction. It should be noted that the second center sipe 211B also has a similar groove shape as the first center sipe 211A, and the side opening thereof opens to the center main groove 110 on the right side of the center rib 210 in FIG. 4, and has a shape which is left/right symmetrical with FIG. 6.

Each of the pair of center ribs 220 has a plurality of intermediate sipes 221 opening to the tread surface 36a, i.e. outer surface of the intermediate rib 220. The intermediate sipe 221 is a fine groove having a shape extending in a direction intersecting the tire-circumferential direction. The groove width of the intermediate sipe 221 is no more than 1 mm.

The plurality of the intermediate sipes 221 includes a plurality of first intermediate sipes 221A and a plurality of second intermediate sipes 221B. The first intermediate sipe 221A is arranged on the first shoulder edge 42A side of the intermediate rib 220 (left side in FIG. 4). The second intermediate sipe 221B is arranged on the second shoulder edge 42B side of the intermediate rib 220 (right side in FIG. 4). The plurality of the first intermediate sipes 221A and plurality of second intermediate sipes 221B are alternately arranged in the tire-circumferential direction. The plurality of the first intermediate sipes 221A is arranged at a predetermined pitch in the tire-circumferential direction. Similar to this, the plurality of second intermediate sipes 221B are also arranged at a predetermined pitch in the tire-circumferential direction.

The first intermediate sipes 221A and second intermediate sipes 221B are the same shape, and the pair of first intermediate sipe 221A and second intermediate sipe 221B adjacent in the tire-circumferential direction are arranged so as to be point symmetrical.

The first intermediate sipe 221A of the intermediate rib 220 on the left side in FIG. 4 opens to the intermediate main groove 120 on the left side of this intermediate rib 220 on this left side, shortly extends from this opening end to the right side while sloping to the upper side, which is one side in the tire-circumferential direction, and then further extends to the right side while bending in a curve to slope to the lower side, which is the opposite side in the tire-circumferential direction, and ends without reaching the center main groove 110 on the right side of this intermediate rib 220 on the left side. On the other hand, the second intermediate sipe 221B of the intermediate rib 220 on the left side in FIG. 4 opens to the center main groove 110 on the right side of this intermediate rib 220 on the left side, shortly extends from this opening end to the left side while sloping to the lower side, which is the other side in the tire-circumferential direction, and then further extends to the left side while bending in a curve to slope to the upper side, which is the opposite side in the tire-circumferential direction, and ends without reaching the intermediate main groove 120 on the left side of this intermediate rib 220 on the left side.

The first intermediate sipe 221A of the intermediate rib 220 on the right side in FIG. 4 opens to the center main groove 110 on the left side of this intermediate rib 220 on the right side, shortly extends from this opening end to the right side while sloping to the upper side, which is one side in the tire-circumferential direction, and then further extends to the right side while bending in a curve to slope to the lower side, which is the opposite side in the tire-circumferential direction, and ends without reaching the intermediate main groove 120 on the right side of this intermediate rib 220 on the right side. On the other hand, the second intermediate sipe 221B of the intermediate rib 220 on the right side in FIG. 4 opens at the intermediate main groove 120 on the right side of this intermediate rib 220 on the right side, and shortly extends from this opening end to the left side while sloping to the lower side, which is the other side in the tire-circumferential direction, and then further extends to the left side while bending in a curve to slope on the upper side, which is the opposite side in the tire-circumferential direction, and ends without reaching the center main groove 110 on the left side of this intermediate rib 220 on the right side.

The tire-width direction length L2 of the first intermediate sipe 221A and second intermediate sipe 221B on the outer surface of the intermediate rib 220 (tread surface 36a) is shorter than the width W4 of the intermediate rib 220. The length L2 in the tire-width direction of the first intermediate sipe 221A and second intermediate sipe 221B is on the order of 17 mm, and more specifically, is set to 17.15 mm, for example. The tire-circumferential pitch P3 of the plurality of first intermediate sipes 221A and tire-circumferential direction pitch P4 of the plurality of second intermediate sipes 221B at the outer surface of the intermediate rib 220 (tread surface 36a) are the same, and are preferably at least 20 mm and no more than 40 mm. These pitches P3, P4 may be equal pitch; however, five different pitches: 23.3 mm, 26.2 mm, 29.5 mm, 33.0 mm, 37.1 mm, for example, may be arranged by configuring so as to randomly arrange in the tire-circumferential direction.

In a pair of first intermediate sipe 221A and second intermediate sipe 221B adjacent in the tire-circumferential direction, when viewing in the tire-circumferential direction, each have an overlap part 222a which overlaps each other. The tire-width direction length 222L of these overlap parts 222a is preferably at least 30% of the width W4 of the intermediate rib 220. In addition, as an upper limit for this ratio, for example, 80% is preferable.

Figure 7:
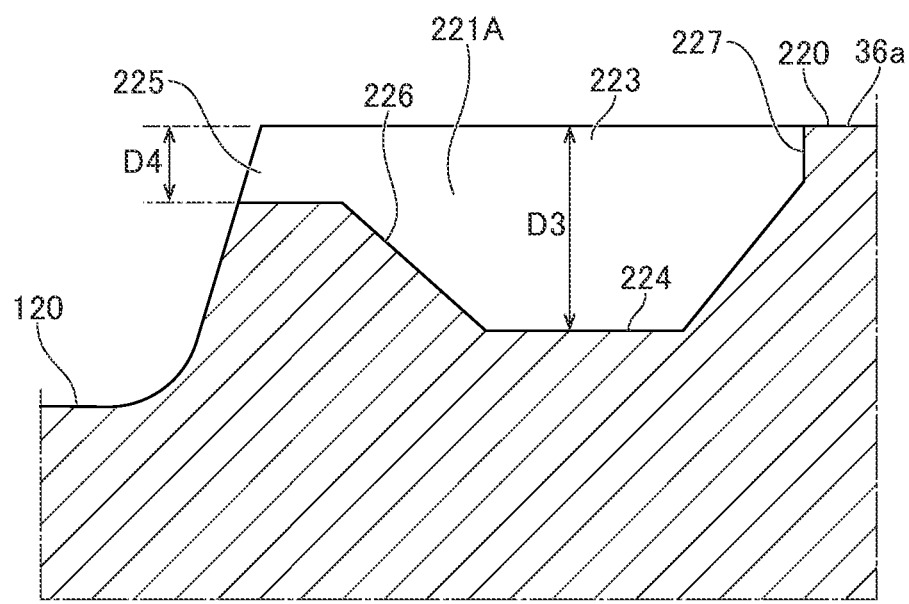
FIG. 7 is a cross-sectional view showing a groove shape of an intermediate sipe (first intermediate sip) according to the embodiment.

FIG. 7 is a cross-sectional view showing the groove shape of the first intermediate sipe 221A, and is a cross-sectional view shown by a cut section along a plane through the groove width center of the first intermediate sipe 221A. As shown in FIG. 7, the first intermediate sipe 221A has an opening 223 to the tread surface 36a, and a bottom part 224 within the intermediate rib 220. Furthermore, the first intermediate sipe 221A has a side opening (corresponding to aforementioned opening end) 225 which opens to the main groove 100 on the left side of the intermediate sipe 221 (intermediate main groove 120 in FIG. 7), a sloped part 226 spanning from the bottom part 224 to the side opening 225, and a terminal edge 227 sloping to form the edge in the width direction within the first intermediate sipe 221A. FIG. 5 shows a mode in which the side opening 225 opens to the main groove 100 on the left side of the intermediate sipe 221 (center main groove 110 or intermediate main groove 120). The bottom part 224 constitutes the deepest part of the first intermediate sipe 221A. The depth D4 of the side opening 225 is smaller than the depth D3 of the bottom part 224. For this reason, the sloped part 226 slopes so that the depth gradually becomes shallower from the bottom part 224 to the side opening 225. The sloped part 226 slopes at approximately 45°, for example, relative to the tire-width direction. It should be noted that the second intermediate sipe 221B also has a groove shape similar to the first intermediate sipe 221A, and the side opening thereof opens to the center main groove 110 or intermediate main groove 120 on the right side of the intermediate rib 220 in FIG. 4 to have a shape that is left/right symmetrical with FIG. 7.

In the intermediate sipe 221, since the depth D4 of the side opening 225 is smaller than the depth D3 of the bottom part 224, a decrease in rigidity of the intermediate rib 220 at the periphery of this side opening 225 is suppressed.

Each of the pair of shoulder ribs 230 has a plurality of slits 231 as the tread pattern 37. The slit 231 is a groove having a groove width exceeding 1 mm. The shoulder rib 230 only has a plurality of slits 231, without the fine sipes having a groove width no more than 1 mm such as the aforementioned center sipe 211 and intermediate sipe 221, as the grooves constituting the tread pattern 37.

Each of the plurality of slits 231 extends in a direction intersecting the tire-circumferential direction. In FIG. 4, the slit 231 of the shoulder rib 230 on the left side has a circular arc shape such that forms a gentle convexity at the lower side, and the slit 231 of the shoulder rib 230 on the right side has a circular arc shape such that forms a gentle convexity at the upper side. The slits 231 formed at each of the left and right shoulder ribs 230 are the same shape, and are arranged so as to be point symmetrical with each other. The slit 231 does not open up at the intermediate main groove 120 at the inner side in the tire-width direction of the shoulder rib 230, but extends until the outer surface of the shoulder 40 and opens up at the side of the shoulder edge 42.

As shown in FIG. 4, the tire-width direction length L3 of the slit 231 in the outer surface of the shoulder rib 230 (tread surface 36a) is shorter than the width W5 of the shoulder rib 230. The length L3 in the tire-width direction of the shoulder rib 230, for example, is on the order of at least 40 mm and no more than 60 mm, for example.

The plurality of slits 231 of the shoulder rib 230 are arranged at a predetermined pitch in the tire-circumferential direction. The tire-circumferential direction pitch P5 of the slits 231 of the shoulder rib 230 is preferably at least 20 mm and no more than 40 mm. The tire-circumferential direction pitch P5 of the plurality of slits 231 may be equal pitch; however, five different pitches: 23.3 mm, 26.2 mm, 29.5 mm, 33.0 mm, 37.1 mm, for example, may be arranged by configuring so as to randomly arrange in the tire-circumferential direction.

According to the tire 1 related to the above explained embodiment, the following effects are exerted.

(1) The tire 1 according to the embodiment is a pneumatic tire including the tread 30 having the tread pattern 37, in which the tread 30 includes: a plurality of ribs 200 extending in the tire-circumferential direction constituting the tread pattern 37; and a plurality of main grooves 100 arranged between the plurality of ribs 200 and extending in the tire-circumferential direction constituting the tread pattern 37, the main grooves 100 include: a pair of center main grooves 110 arranged in the center in the tire-width direction, and a pair of intermediate main grooves 120 respectively arranged at the outer side in the tire-width direction of the pair of center main grooves 110, the ribs 200 include: one center rib 210 arranged between the pair of center main grooves 110, and a pair of intermediate ribs 220 arranged between the center main groove 110 and intermediate main groove 120, the intermediate rib 220 has a plurality of intermediate sipes 221 arranged at a predetermined pitch in the tire-circumferential direction and extending in a direction intersecting the tire-circumferential direction, the intermediate sipes 221 include a plurality of first intermediate sipe 221A on one side in the tire-width direction and a plurality of second intermediate sipe 221B on the other side in the tire-width direction, the plurality of first intermediate sipes 221A and the plurality of second intermediate sipes 221B are alternately arranged in the tire-circumferential direction, the width W3 of the center rib 210 has a size which is at least 104% of the width W4 of the intermediate rib 220, the pair of intermediate sipes 221 adjacent in the tire-circumferential direction have overlap parts 222a which overlap each other when viewing in the tire-circumferential direction, and the tire-width direction length of this overlap part 222a is at least 30% of the width of the intermediate rib.

According to the tire 1 of the embodiment, since the width W3 of the center rib 210 has a size which is at least 104% of the width W4 of the intermediate rib 220, wear of the center rib 210 which tends to be loaded is suppressed. In the tire 1 of the embodiment, the tire-width direction cross-sectional shape of the tread surface 36a contacting the road surface in a state filled with internal pressure makes a circular arc shape of a convexity to the road surface side, in extreme terms; therefore, load tends to act more on the center rib 210 and wear more than the intermediate ribs 220 on both sides of the center rib 210. This is remarkable in a high-load type vehicle for which the vehicle weight is relatively heavy such as SUVs and EVs, for example. However, according to the tire 1 of the embodiment, since the width of the center rib 210 has a size which is at least 104% of the width of the intermediate rib 220, the load acting on the center rib 210 disperses more than the intermediate rib 220. For this reason, the extent of wear of the center rib 210 is suppressed from greatly varying with the extent of wear of the intermediate rib 220, a result of which uneven wear of the center rib 210 is suppressed. As a result of these, the tire 1 according to the embodiment can suppress uneven wear of the center rib 210, and is also applicable to high-load type vehicles.

The tire 1 of the embodiment assumes a structure in which the pair of intermediate ribs 220 influence CFmax (maximum cornering force) more than the center rib 210. According to the tire 1 of the present embodiment, the pair of intermediate sipes 221 adjacent in the tire-circumferential direction of the intermediate rib 220 has overlap parts 222a which overlap each other when viewing in the tire-circumferential direction, and the tire-width direction length 222L of this overlap part 222a is preferably at least 30% of the width W4 of the intermediate rib 220. The pattern rigidity of the intermediate rib 220 thereby moderately decreases and the contact length increase, and thus an improvement in CFmax is achieved.

It should be noted that the ratio of the width W3 of the center rib 210 relative to the width W4 of the intermediate rib 220 is at least 104%, and is preferably at least 120%. If exceeding 120%, the width of the width W4 of the intermediate rib 220 becomes smaller, and there is concern over the wear resistance of the intermediate rib 220 declining, and CFmax decreasing. Therefore, the width W3 of the center rib 210 preferably has a size which is at least 104% and no more than 120% of the width W4 of the intermediate rib 220.

It should be noted that the tire-width direction length of the overlap part 222a of the pair of intermediate sipes 221 adjacent in the tire-circumferential direction is preferably at least 30% of the width of the intermediate rib 220, and no more than 80%. By establishing the tire-width direction length of the overlap part 222a as at least 30% of the width of the intermediate rib 220, it is possible to obtain the effect of suppressing a decrease in CFmax which can be generated by increasing the aforementioned ratio of the width W3 of the center rib 210.

(2) In the tire 1 according to the embodiment, it is preferable for the center rib 210 to have a plurality of center sipes 211 arranged at a predetermined pitch in the tire-circumferential direction and extending in a direction intersecting the tire-circumferential direction and opening at the tread surface 36a, the center sipes 211 to include a plurality of first center sipes 211A on one side in the tire-width direction, and a plurality of second center sipes 211B on the other side in the tire-width direction, the plurality of first center sipes 211A and the plurality of second center sipes 211B to be alternately arranged in the tire-circumferential direction, and the first center sipe 211A and second center sipe 211 not to overlap each other when viewing in the tire-circumferential direction.

A decrease in rigidity of the center rib 210 is thereby suppressed.

(3) In the tire 1 according to the embodiment, it is preferable for the tire-circumferential direction pitch of the first center sipes 211A and the tire-circumferential direction pitch of the second center sipes 211B to be respectively at least 20 mm and no more than 40 mm, and the tire-circumferential pitch of the first intermediate sipes 221A and tire-circumferential direction pitch of the second intermediate sipes 221B to be respectively at least 20 mm and no more than 40 mm.

It thereby becomes possible to achieve a decrease in the pattern noise.

(4) In the tire 1 according to the embodiment, it is preferable for the intermediate sipe 221 to have the side opening 225 which opens to the main groove 100, and the depth of the side opening 225 to be smaller than the depth of another region including the bottom part 224 of this intermediate sipe 221.

In the intermediate rib 220, the decrease in rigidity at the periphery of the side opening 225 of the intermediate sipe 221 is thereby suppressed.

(5) In the tire 1 according to the embodiment, it is preferable for the rib 200 to further include a pair of the shoulder ribs 230 arranged at the outer side in the tire-width direction of the intermediate main groove 120, the shoulder rib 230 to have a plurality of slits 231 having a greater groove width than the groove width of the intermediate sipe 221 and the groove width of the center sipe 211 as the tread pattern 37, and the plurality of slits 231 to extend in a direction intersecting the tire-circumferential direction, and arranged at a predetermined pitch in the tire-circumferential direction.

Since the shoulder rib 230 has only a plurality of slits 231 as the tread pattern 37, and does not have sipes such as the center sipe 211 and intermediate sipe 221, an improvement in CFmax is thereby achieved. EXAMPLES Hereinafter, examples will be explained. Tires of Examples 1 to 5 in which the ratio of width of the intermediate rib relative to the width of the center rib was varied in a range of 104% or greater, and the length of an overlap part in the tire-width direction of the intermediate sipe of the intermediate rib was varied in a range of 30% or greater, were evaluated by a simulation model. The respective data sets of Examples 1 to 5 are shown in Table 1. It should be noted that, in Table 1, "ratio of width of center rib to width of intermediate rib" is expressed as "ratio of Ce rib", and "center rib (mm)/intermediate rib (mm)" is expressed as "Ce rib (mm)/Me rib (mm)". In addition, in Table 1, "ratio of tire-width direction length of overlap part of center sipe relative to width of intermediate rib" is expressed as "Me sipe-lap ratio", and "tire-width direction length of overlap part of intermediate sipe/width of intermediate rib" is expressed as "lap length/Me rib width". It should be noted that Examples 1 to 4 have sipes in the shoulder rib, and Example 5 established only a slit without sipes.

On the one hand, tires of a mode in which the ratio of the width of the center rib relative to the width of the intermediate rib is at least 104%, but a plurality of intermediate sipes are only arranged at an end side in the width direction of the intermediate rib were evaluated by a simulation model, i.e. Comparative Examples 3 to 5 in which only the first intermediate sipes 221A in the above embodiment, or only the second intermediate sipes 221B are arranged in the intermediate rib, and there is no overlap part in the intermediate sipes, Comparative Example 2 in which the width of the center rib is the same as the width of the intermediate rib (ratio of Ce rib: 100%), and the intermediate sipes have no overlap part similarly to the aforementioned Comparative Examples 3 to 5, and Comparative Example 1 of conventional type in which the width of the center rib is smaller than the intermediate rib (ratio of Ce rib: 95.7%) and the intermediate sipes have no overlap part similarly to the aforementioned Comparative Examples 3 to 5. It should be noted that the size of the tires of Examples 1 to 5 and Comparative Examples 1 to 5 are all "215/55R17 94V", and have a basic configuration the same as the above embodiment. In addition, the respective data sets of Examples 1 to 5 and Comparative Examples 1 to 5 are data sets in an unloaded state mounting the tire to a standard rim and establishing air pressure of 230 kPa.

that the uneven wear ratio of the center rib becomes smaller as the ratio became larger, and it was found that it is possible to suppress uneven wear when the width of the center rib is larger than the width of the intermediate rib. On the other hand, from Examples 1 to 7 having an overlap part in the intermediate sipe, it is recognized that CFmax improved, and it is found to contribute to an improvement in CFmax as the length of the overlap part increased. In addition, from Example 5, it is assumed that CP improved when not having a sipe in the shoulder rib. It should be noted that, since there is a possibility of CFmax somewhat declining when the ratio of the width of the center rib relative to the width of the intermediate rib exceeds 120% as in Example 8, this ratio is preferably no greater than 120%.

According to the Examples, so long as the ratio of the width of the center rib relative to the width of the intermediate rib is at least 104%, it is possible to effectively suppress uneven wear of the center rib. In addition, if setting the ratio of the tire-width direction length of the overlap part of the intermediate sipe relative to the width of the intermediate rib to at least 30%, it is possible to improve CFmax.

What is claimed is:

1. A pneumatic tire comprising a tread having a tread pattern,
the tread comprising:

TABLE 1

| | Comparative Example 1 | Comparative Example 2 | Comparative Example 3 | Comparative Example 4 | Comparative Example 5 | Example 1 | Example 2 | Example 3 | Example 4 | Example 5 | Example 6 | Example 7 | Example 8 |
|---|---|---|---|---|---|---|---|---|---|---|---|---|---|
| Ratio of Ce rib | 95.7% | 100% | 104.3% | 108.7% | 113.0% | 104.3% | 104.3% | 104.3% | 104.3% | 104.3% | 113.0% | 117.4% | 123.8% |
| Ce rib(mm)/Me rib(mm) | 24.4/25.5 | 23/23 | 24/23 | 25/23 | 26/23 | 24/23 | 24/23 | 24/23 | 24/23 | 24/23 | 26/23 | 27/23 | 26/21 |
| Me sipe-lap ratio | 0% | 0% | 0% | 0% | 0% | 30.4% | 49.1% | 69.6% | 100% | 49.1% | 49.1% | 49.1% | 53.8% |
| Lap length/Me rib width | 0/25.5 | 0/23 | 0/23 | 0/23 | 0/23 | 7/23 | 11.3/23 | 16/23 | 23/23 | 11.3/23 | 11.3/23 | 11.3/23 | 11.3/21 |
| Shoulder rib with/without sipe | with sipe | with sipe | with sipe | with sipe | with sipe | with sipe | with sipe | with sipe | with sipe | without sipe | with sipe | with sipe | with sipe |
| Uneven wear ratio | 100 | 96 | 92 | 89 | 87 | 92 | 92 | 92 | 92 | 92 | 87 | 85 | 84 |
| CP | 100 | 100 | 100 | 100 | 100 | 100 | 100 | 100 | 100 | 101 | 100 | 100 | 100 |
| CFmax | 100 | 100 | 100 | 100 | 100 | 101 | 102 | 103 | 104 | 102 | 102 | 102 | 98 |

For the tires of Examples 1 to 8 and Comparative Examples 1 to 5, the uneven wear ratio of the center rib, CP (cornering power) and CFmax were simulation measured. Upon measurement, it was performed with applying 69% load of the maximum load weight of the road index given to the tire. It should be noted that the uneven wear ratio of the center rib was established as a ratio of the groove loss amount of the center main groove relative to the groove loss amount of the slit of the shoulder rib.

The results thereof are noted together in Table 1. It should be noted that, in Table 1, each value of Comparative Example 1, which is conventional type, is established as index 100, and the tires of Comparative Examples 2 to 5 and Examples 1 to 8 were index evaluated. The uneven wear ratio is determined as more favorable with a smaller value of index evaluation, the CP is determined as more favorable with a larger value of index evaluation, and the CFmax is determined as more favorable with a larger value of index evaluation.

According to Table 1, it is recognized from Comparative Examples 1 to 5 having gradually larger ratios of width of the center rib relative to the width of the intermediate rib, a plurality of ribs extending in a tire-circumferential direction constituting the tread pattern, and
a plurality of main grooves disposed between the plurality of ribs, and extending in the tire-circumferential direction constituting the tread pattern;
the main grooves comprising:
a pair of center main grooves disposed at a center in a tire-width direction, and
intermediate main grooves respectively disposed at an outer side in the tire-width direction of the pair of center main grooves; and
the ribs comprising:
one center rib disposed between the pair of center main grooves, and
intermediate ribs, each intermediate rib disposed between each center main groove and each intermediate main groove,
wherein each intermediate rib has a plurality of intermediate sipes disposed at a predetermined pitch in the tire-circumferential direction, and extending in a direction which intersects the tire-circumferential direction,
wherein the intermediate sipes include a plurality of first intermediate sipes on one side in the tire-width direction and a plurality of second intermediate sipes on another side in the tire-width direction, and the plurality of first intermediate sipes and the plurality of second intermediate sipes are alternately disposed in the tire-circumferential direction, wherein a width of the center rib has a size which is at least 104% of a width of the intermediate rib, wherein a pair of the intermediate sipes adjacent in the tire-circumferential direction have overlap parts which overlap each other when viewing in the tire-circumferential direction, and a tire-width direction length of the overlap part is at least 30% of the width of the intermediate rib, wherein each first intermediate sipe has a first segment extending from an opening end thereof sloping towards a first direction in the tire-circumferential direction and a second segment sloping towards an opposite direction in the tire-circumferential direction, wherein each second intermediate sipe has a first segment extending from an opening end thereof sloping towards the opposite direction in the tire-circumferential direction and a second segment sloping towards the first direction in the tire-circumferential direction, wherein the center rib has a plurality of center sipes disposed at a predetermined pitch in the tire-circumferential direction, extending in a direction intersecting the tire-circumferential direction and opening at a tread surface, wherein the center sipes include a plurality of first center sipes on one side in the tire-width direction, and a plurality of second center sipes on another side in the tire-width direction, and the plurality of first center sipes and the plurality of second center sipes are alternately disposed in the tire-circumferential direction, and wherein the first center sipe and the second center sipe do not overlap each other when viewing in the tire-circumferential direction.

2. The pneumatic tire according to claim 1, wherein a tire-circumferential direction pitch of the first center sipes and a tire-circumferential pitch of the second center sipes are respectively at least 20 mm and no more than 40 mm, and wherein a tire-circumferential direction pitch of the first intermediate sipes and a tire-circumferential direction pitch of the second intermediate sipes are respectively at least 20 mm and no more than 40 mm.

3. The pneumatic tire according to claim 1, wherein each intermediate sipe of the plurality of intermediate sipes has a side opening which opens to one of the center or intermediate main grooves, and a depth of the side opening is smaller than a depth of other regions of the intermediate sipe.

4. The pneumatic tire according to claim 1, wherein the ribs further include a pair of shoulder ribs disposed at an outer side in a tire-width direction of the intermediate main grooves, and the shoulder ribs include only a plurality of slits having a larger groove width than a groove width of the intermediate sipes and a groove width of the center sipes, and wherein the plurality of slits extends in a direction intersecting the tire-circumferential direction, and are disposed at a predetermined pitch in the tire-circumferential direction.

5. The pneumatic tire according to claim 2, wherein the ribs further include a pair of shoulder ribs disposed at an outer side in a tire-width direction of the intermediate main grooves, and the shoulder ribs include only a plurality of slits having a larger groove width than a groove width of the intermediate sipes and a groove width of the center sipes, and wherein the plurality of slits extends in a direction intersecting the tire-circumferential direction, and are disposed at a predetermined pitch in the tire-circumferential direction.

6. The pneumatic tire according to claim 3, wherein the ribs further include a pair of shoulder ribs disposed at an outer side in a tire-width direction of the intermediate main grooves, and the shoulder ribs include only a plurality of slits having a larger groove width than a groove width of the intermediate sipes and a groove width of the center sipes, and wherein the plurality of slits extends in a direction intersecting the tire-circumferential direction, and are disposed at a predetermined pitch in the tire-circumferential direction.

7. The pneumatic tire according to claim 1, wherein the overlap parts are the second segments of the intermediate sipes.

* * * * *